(12) United States Patent
Jablonski et al.

(10) Patent No.: US 10,502,227 B2
(45) Date of Patent: *Dec. 10, 2019

(54) FAN FOR A TURBOMACHINE

(71) Applicant: Safran Aircraft Engines, Paris (FR)

(72) Inventors: Laurent Jablonski, Moissy Cramayel (FR); Philippe Gérard Edmond Joly, Moissy Cramayel (FR); Christophe Perdrigeon, Moissy Cramayel (FR); Damien Merlot, Moissy Cramayel (FR); Hervé Pohier, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 524 days.

This patent is subject to a terminal disclaimer.

(21) Appl. No.: 15/039,557

(22) PCT Filed: Nov. 26, 2014

(86) PCT No.: PCT/FR2014/053035
§ 371 (c)(1),
(2) Date: May 26, 2016

(87) PCT Pub. No.: WO2015/079163
PCT Pub. Date: Jun. 4, 2015

(65) Prior Publication Data
US 2017/0167504 A1  Jun. 15, 2017

(30) Foreign Application Priority Data
Nov. 29, 2013 (FR) ...................................... 13 61905

(51) Int. Cl.
*F04D 29/32* (2006.01)
*F01D 5/34* (2006.01)
(Continued)

(52) U.S. Cl.
CPC ............. *F04D 29/329* (2013.01); *F01D 5/14* (2013.01); *F01D 5/30* (2013.01); *F01D 5/303* (2013.01);
(Continued)

(58) Field of Classification Search
None
See application file for complete search history.

(56) References Cited

U.S. PATENT DOCUMENTS 6,732,502 B2    5/2004  Seda et al.
6,951,448 B2 *  10/2005  Duesler .................. F01D 5/323
                                                 416/220 R
(Continued)

FOREIGN PATENT DOCUMENTS

CA    2 833 986 A1    5/2014
EP    2 128 450 A1    12/2009
(Continued)

OTHER PUBLICATIONS

GE Aviation CF34-8C (Published May 2010—Engine in service since Jun. 2006) (Year: 2010).*
(Continued)

*Primary Examiner* — Igor Kershteyn
*Assistant Examiner* — Juan G Flores
(74) *Attorney, Agent, or Firm* — Blank Rome LLP

(57) ABSTRACT

The invention proposes a fan, in particular for a turbomachine of small size such as a jet engine, having a hub ratio which corresponds to the ratio of the diameter of the inner limit of the incoming air stream (26) at the radially inner ends of the leading edges of the fan blades (10), divided by the diameter of the circle around which the outer ends of the fan blades pass, having a value of between 0.20 and 0.265.

13 Claims, 8 Drawing Sheets

Figure 1:
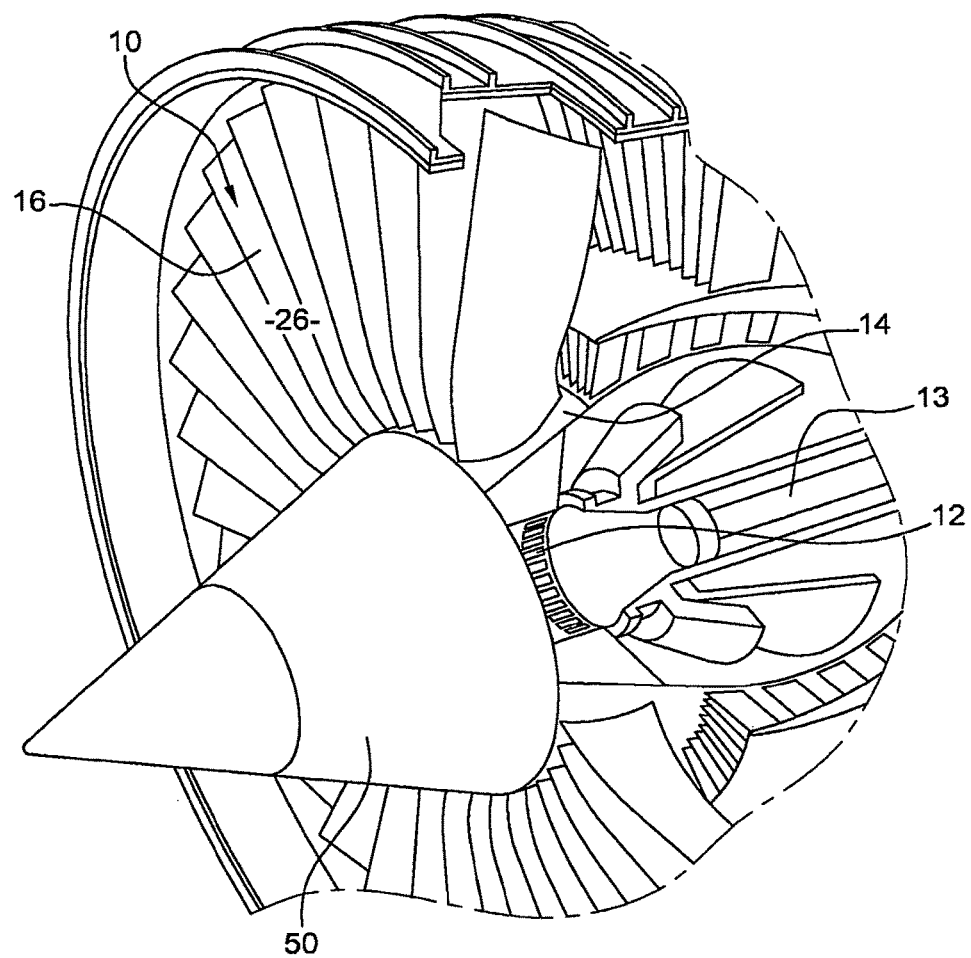

(51) Int. Cl.
*F01D 5/14* (2006.01)
*F01D 5/30* (2006.01)
*F01D 5/32* (2006.01)
*F04D 19/00* (2006.01)
*F04D 29/02* (2006.01)
*F04D 29/053* (2006.01)
*F04D 29/38* (2006.01)

(52) U.S. Cl.
CPC ......... *F01D 5/3053* (2013.01); *F01D 5/3069* (2013.01); *F01D 5/32* (2013.01); *F01D 5/323* (2013.01); *F01D 5/34* (2013.01); *F04D 19/002* (2013.01); *F04D 29/023* (2013.01); *F04D 29/053* (2013.01); *F04D 29/322* (2013.01); *F04D 29/38* (2013.01); *F05D 2220/36* (2013.01); *Y02T 50/671* (2013.01)

(56) References Cited

U.S. PATENT DOCUMENTS

| | | | |
|---|---|---|---|
| 8,092,183 B2 | 1/2012 | Borzakian et al. | |
| 8,568,101 B2* | 10/2013 | Fujimura | F01D 5/3007 416/204 A |
| 9,151,168 B2* | 10/2015 | Jablonski | F01D 5/3007 |
| 9,303,589 B2* | 4/2016 | Heikurinen | F04D 29/023 |
| 2010/0034659 A1* | 2/2010 | Fujimura | F01D 5/3007 416/219 R |
| 2012/0282104 A1* | 11/2012 | Jablonski | F01D 5/3007 416/219 R |

FOREIGN PATENT DOCUMENTS

| | | |
|---|---|---|
| FR | 2 975 449 A1 | 11/2012 |
| RU | 2 302 545 C2 | 7/2007 |
| RU | 2 392 475 C1 | 6/2010 |
| RU | 2 487 250 C2 | 7/2013 |
| SU | 1 827 985 A1 | 9/2005 |

OTHER PUBLICATIONS

Current and Future Usage of Materials in Aircraft Gas Turbine Engines (Feb. 1, 1970—DMIC Memo 245) (Year: 1970).*
T. Dubois, "GE's Passport 20 Engine Is On Time To Power New Globals", Aviation International News. May 14, 2012.
C. Epstein, "GE's Passport 20 Engine Program Is On Schedule for 2016 Entry into Service", Aviation International News, Oct. 22, 2013.
G. Norris, "GE Passport Takes Shape", AWIN content from Aviation Week, Oct. 11, 2011.

* cited by examiner

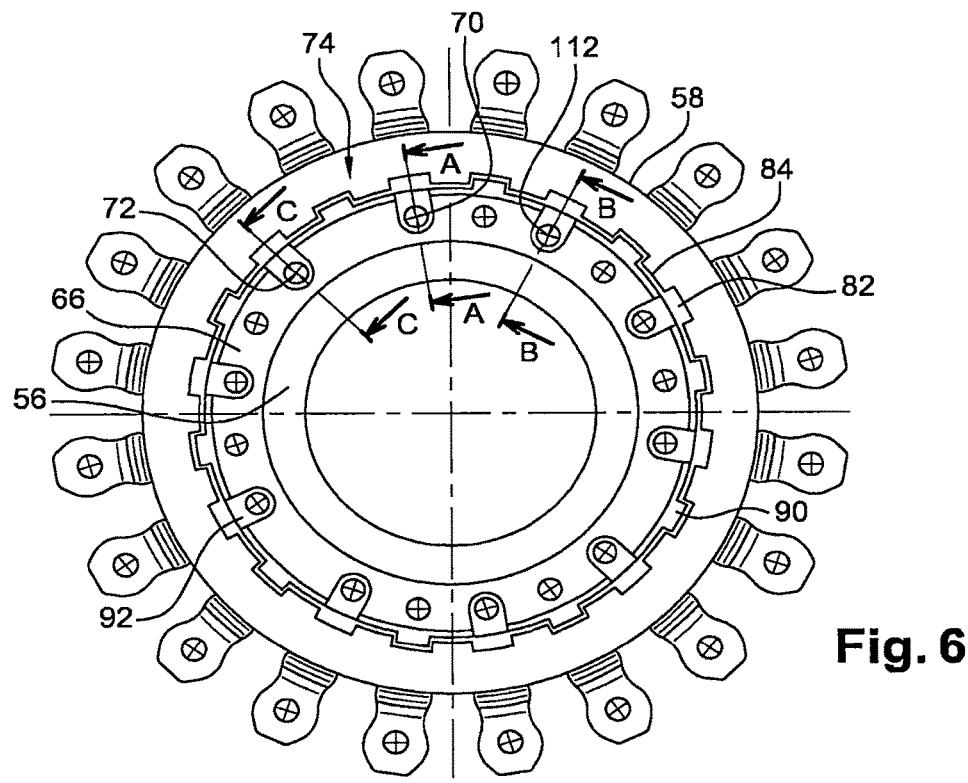
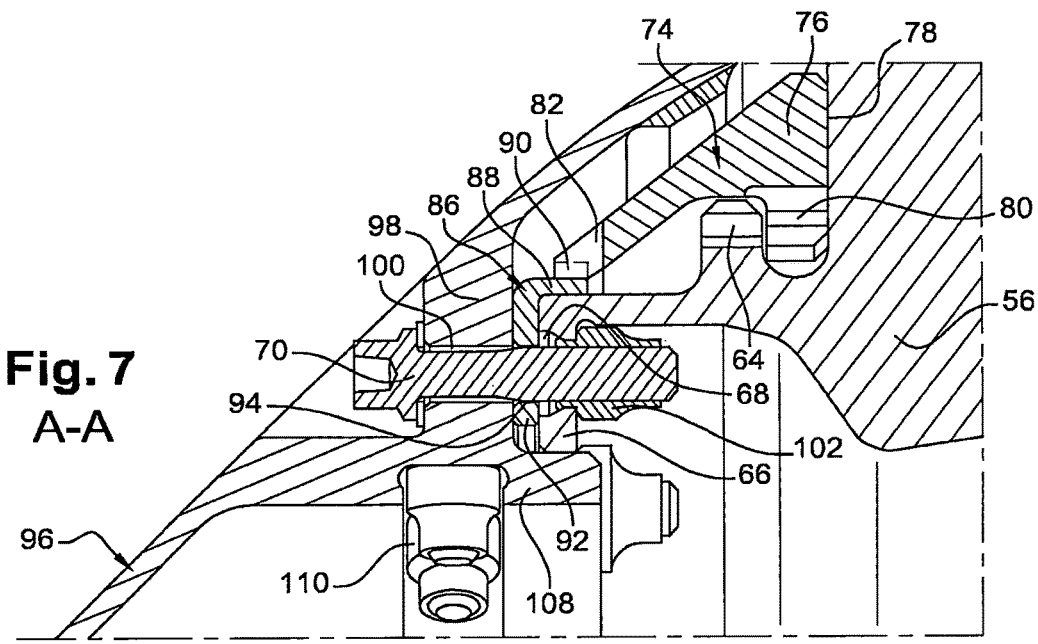
Fig. 6
Fig. 7
A-A

B-B

C-C

FAN FOR A TURBOMACHINE

The present invention concerns obtaining specific dimensions for a fan, particularly for a turbomachine, such as a jet engine.

The invention constitutes a genuine technical challenge and is specifically of value when it relates to turbomachines, the external dimensions of which have been designed to adapt to the field of business aviation. Typically, these turbomachines, relatively small in size, have an intake diameter, defined by the upstream diameter of the turbomachine stream, of between 900 mm and 1550 mm, in order to possess dimensions closely related to a total mass and suitable for installation on aircraft of the business jet type.

As on any type of turbomachine, the developments concerning this type of small-sized turbomachine mainly concern improvement in performances, a reduction in consumption and a saving in weight. There are many lines of development in this respect, which may for example relate to the choices of materials, study of the shapes of the blades, optimisation of the mechanical links among the components, prevention of leaks, etc.

One of the lines of development generally pursued involves reducing the hub ratio of the turbomachine fan. This hub ratio is the ratio between the external diameter of the hub at the leading edges of the fan blades and the diameter of the circle around which the radial ends of these fan blades pass. The reduction in the hub ratio generally means a radial reduction in the size of the hub and therefore a saving in weight, but also involves an increase in the suction section of the turbomachine, incurring an increase in the air flow propelling the turbomachine and therefore enhanced performances. However, taking into account the current know-how in the design and manufacture of small-sized turbomachines, such as those having an intake diameter defined above, this type of turbomachine is considered as not allowing a reduction in the external diameter of the hub, particularly at the leading edges of the fan blades, to below the diameter currently employed which is typically between 570 and 585 mm. Indeed, the current dimensions of the mechanical elements forming the hub are considered non-reducible, mainly for obvious reasons of radial mechanical strength of the blades, torsional resistance, tolerances and methods of manufacture and accessibility to tools, etc.

In contradiction to these technical prejudices, the invention proposes a choice of specific dimensions for a turbomachine fan affording a significant improvement in performances and weight.

To this end, the invention proposes a fan, particularly for a turbomachine such as a jet engine, wherein the fan comprises at the intake, fan blades, an annular casing, a hub rotating around an axis of the turbomachine and bearing the blades, which extend radially in relation to said axis in an annular stream delimited internally by the hub and externally by the annular casing, wherein said fan has an intake diameter, which corresponds to the diameter of the circle comprising the radially outer ends of the blades, of a value of between 900 mm and 1550 mm and possesses a hub ratio, which corresponds to the ratio of the diameter of the inner limit of the stream at the radially inner ends of the leading edges of the fan blades, divided by the intake diameter, of a value of between 0.20 and 0.265.

According to a first embodiment, the hub comprises a fan disc constructed in one piece with the blades.

According to a second embodiment, the hub comprises a fan disc comprising at its outer circumference substantially axial ribs formed in alternation with grooves in which the roots of the blades are engaged.

More specifically, an intake diameter of between 900 mm and 1200 mm is proposed, in order to obtain even more advantageous results in terms of weight. As will be explained later, the specific choice of such an external diameter is all the more subject to technical prejudice.

Furthermore, a specific mechanical arrangement of the rotor of this fan is proposed that is particularly well suited to this choice of dimensions.

Usually, the rotor of a turbomachine fan comprises a disc constructed in one piece with the blades, or bearing at its outer circumference blades, the roots of which are engaged in substantially axial grooves of the outer circumference of the disc.

In a case in which the blades are engaged on the disc, the blades are held radially on the disc by positive interlocking of their roots with the grooves of the disc, wherein the blade roots are for example of the dovetail type. Inter-blade platforms are mounted on the disc between the fan blades. The disc is usually equipped with balancing systems (known as "leeks") extending radially inwards.

In the current technology, the blades are axially maintained on the disc by means that are mounted on the disc, upstream and downstream from the blades, which prevent the blade roots from moving axially in the grooves of the disc.

The retaining means located downstream from the blades comprise for example at least one blade root hook which is engaged in a notch machined on an upstream end portion of the low-pressure compressor arranged downstream from the fan. In order to allow fixing of these hooks in the notches of the low-pressure compressor, the disc grooves need to be expanded radially in relation to the blade roots. It is thus possible to move the blades axially in the bottom of the grooves and position the blade root hooks aligned radially opposite the notches. It is subsequently possible to raise the blades radially in the grooves using adequately thick shims, arranged at the bottom of the grooves, in order to engage the blade root hooks in the notches and keep the blades in the top position.

The retaining means located upstream comprise for example an annular flange attached and fastened to the upstream end of the disc. The flange is mounted coaxially on the disc and comprises a scalloped section interacting with a corresponding scalloped section of the disc. This flange secures the ring axially on the disc and is secured against rotation in relation to the disc. The outer circumference of the flange is axially supported on the blade roots for their axial retention in the downstream direction, whilst its inner circumference is applied and fixed to a corresponding annular collar of the disc. The outer circumference of the flange furthermore comprises fastening pins for the upstream ends of the inter-blade platforms.

A substantially truncated cone-shaped shell mounted on the disc, upstream from the blades, delimits internally the annular incoming air stream into the turbomachine. This shell comprises near its downstream end a radially inner annular collar applied axially to the aforementioned flange and which is fixed with the flange to the collar of the disc by bolts.

A truncated cone-shaped cowling is furthermore mounted on the aforementioned shell, on the upstream portion of the latter, by means of other bolts, engaged in holes of the collars of the cowling and of the shell and which are located radially inside the bolts for fixing the shell to the disc.

Whether a disc constructed in one piece with the blades is involved, or a disc comprising grooves in which the blades are engaged, the disc is fixed to a downstream drive shaft via a radial annular collar of the disc fixed to a radial annular collar of the shaft by means of a series of nuts aligned circumferentially and screwed axially through the collars.

In order to perform assembly and disassembly of the fan rotor, it is necessary to be able to gain access to these nuts axially using a tool. For this purpose, the operator must have sufficient space available around the central axis. If the fan diameter is small and in particular if the hub ratio of the fan is that mentioned in this patent application, the prior art structure described above does not allow access to the aforementioned nuts. Indeed, the balancing systems ("leeks") of the disc are in this case formed in the axial alignment of the nuts and markedly reduce the available space around the central axis upstream from the drive shaft for access to the nuts.

Furthermore, the loads transmitted by the shaft to the disc are borne entirely by the bolted aforementioned collars, which are elements particularly sensitive to deformations and breaks in the torque transmission chain from the shaft to the fan disc. In the case mentioned above, since the radial and circumferential dimensions of these collars are very small, there are major risks of deformation and breakage of the latter during operation.

Whether a disc constructed in one piece with the blades is involved, or a disc comprising grooves in which the blades are engaged, the prior art therefore does not allow, in accordance with the technical prejudice mentioned, formation of a fan of a dimension and hub ratio defined by the invention.

Document EP 1 357 254 also discloses a fan rotor, the structure of which has large radial and axial design envelopes.

Providing a simple, effective and economical solution to this problem is an objective sought here, also as an aim in itself, possibly regardless of the constraints of intake diameter and hub ratio mentioned above and claimed.

To this end, it is proposed that provision be made for a torque transmission between the fan disc and a downstream drive shaft centred on the same axis, said torque transmission being achieved via an annular row of axial splines of the disc that interact with an annular row of axial splines of the shaft.

Preferentially, the splines of the disc are formed on the inside surface of a cylindrical wall of the disc, wherein said cylindrical wall surrounds the drive shaft.

According to another characteristic, the cylindrical surface is formed at the downstream end of the disc and is connected to the remainder of the disc via a truncated cone-shaped wall flaring out in the upstream direction.

Advantageously, at least one annular shoulder is formed on the surface of the drive shaft and is in axial abutment downstream against a stop on the disc.

The stops may be formed by the downstream end of the cylindrical wall and/or a radial annular edge extending inside the truncated cone-shaped wall.

Preferentially, a nut is installed on a thread of the outer surface of the upstream end of the shaft and forms an axial abutment from the upstream direction on at least one stop of the disc, in order to maintain the stop clamped axially between said nut and a shoulder of the shaft.

The nut typically has a diameter of between 105 mm and 135 mm and preferably between 115 mm and 125 mm.

The structure defined above offers a more resistant method of torque transmission than that involving bolted radial collars. Indeed, when a collar connection involves the presence of radial walls that are relatively weak during bending and the presence of bolts inserted into a limited number of orifices where the loads are concentrated along the circumference of the collars, the spline connection allows distribution of the torque over the entire circumference of splined cylindrical walls capable of better withstanding high shear loads.

Whether a disc constructed in one piece with the blades is involved, or a disc comprising grooves in which the blades are engaged, the structure defined above therefore solves the problem of mechanical strength between the transmission shaft and the disc within the context of the fan of a dimension and hub ratio defined by the invention.

The fan rotor described above, the proposed design of which is directly related to the choice of the hub ratio made within the context of executing a small-sized turbomachine, was furthermore developed in connection with the technical environment described below. This environment proposed by the inventors allows in particular formation of a particular arrangement of the fan rotor that provides a solution for mounting the disc on the drive shaft in order to obtain the splined connection expressed in this patent application.

The specific choice of hub ratio mentioned in this patent application involves in fact an overall reduction in the dimensions of the fan disc of the turbomachine in relation to the prior art. This disc has an external diameter, the value of which is in this case typically included between 245 and 275 mm. If the blades are engaged on the disc, it remains necessary however that this disc should meet the constraints relating to keeping the fan blades in operation, the number and dimensions of which remain relatively the same in relation to the prior art. To this end, the number of blades is preferably between 17 and 21 blades and more specifically between 18 and 20 blades. The height and width of the grooves of the disc must, furthermore, according to the knowledge of the current technology, not undergo any reduction in dimensions in order on the one hand to allow engagement of the downstream hooks, for axial retention of the blades, mentioned in this application and on the other hand be adapted to the size of the blade roots, the dimensions of which have not been reduced in order to bear the rotating blades.

The simultaneous requirements of preservation of the dimensions of the grooves of the disc and reduction in the overall diameter of the disc involve in this case necessarily a decrease in the width, i.e. in the circumferential dimension of the ribs of the disc. The ribs of the fan disc, finer in this case than in the prior art proposing a higher hub ratio, consequently display greater weakness and a higher risk of breakage in relation to the torque sustained during operation than the ribs of the prior art.

In order to solve this problem, it was proposed to construct the fan disc in an inconel alloy, which is very strong. This alloy is however very heavy, which harms the overall performances of the turbomachine and therefore does not represent a satisfactory solution.

Within the context of the fan rotor described above, it was noticed, unexpectedly, that when the blades are engaged on the disc, the axial securing of the blades performed by a specific arrangement of the disc, of a retaining flange upstream from the disc, of a ring and of a fan cowling, with this assembly having been developed by the inventors, was sufficiently effective and resistant in order to dispense with the axial securing performed by the downstream hooks of the fan roots engaged in the low-pressure compressor, with respect to a turbomachine, the dimensions of which have been specified above.

This specific arrangement of axial securing of the blades consists of an annular cowling mounted on the disc upstream from the blades and means of axial retention of the blades on the disc comprising a flange installed in an annular recess of the disc and forming an axial abutment of the blade roots, wherein the flange comprises a scalloped radial annular edge interacting with a scalloped radial annular edge of the annular recess of the disc, so as to ensure annular securing of the flange in the annular recess of the disc and means of preventing rotation of the flange, comprising a ring equipped with ears extending radially towards the inside and formed with means on fixing on an upstream radial face of the disc, wherein said cover is fixed to the disc by means of fixing common to the means of fixing of at least some ears of the ring on the disc, wherein the ring furthermore comprises at least one radial protrusion interacting with an additional stop of the flange, so as to prevent rotation of the flange in relation to the ring.

The inventors have therefore advantageously eliminated the downstream hook for axial securing of the blades and have consequently been able to reduce the radial height of the grooves of the fan disc, one portion of which was previously reserved for installing the downstream hooks, at a height typically included between 18 and 22 mm.

The reduction in the radial dimension of the grooves directly involves a radial reduction in the ribs that allows formation of the internal surface of this disc by a balancing profile derived from a truncated cone-shaped bore coaxial to the axis of the fan and of which the radius increases in the upstream to downstream direction. This balancing profile, in addition to adequately balancing the fan disc, has a minimum diameter, upstream, of a value typically included between 120 and 140 mm, which is larger than the minimum diameter of the balancing profile with "leeks" used for the higher grooves, for an equivalent external diameter of the disc.

This new disc balancing profile provides a larger annular space in the middle of the fan disc for axial passage of tools required for mounting and clamping the fan disc on the drive shaft of the turbomachine, by means of an arrangement making use of a spline connection, as described in the present patent application.

Furthermore, reduction in the radial dimension of the fan disc grooves subsequently gives the latter more compact proportions better withstanding shear torques during operation. By means of the solution shown here, the structure of the ribs of the fan disc therefore yields a structure that is sufficiently strong in order to be formed of titanium alloy which is much lighter than an inconel alloy.

It is therefore possible to propose, in case of a fan rotor comprising blades engaged on a disc, that said fan rotor be devoid of means of axial retention of the fan blades on the fan disc, downstream from the blades. This fan rotor solely comprises the upstream flange as described in the present patent application as means of axial retention of the blades. This specific feature is particularly relevant within the context of fans of small-sized turbomachines relating to the invention and having the dimensions and hub ratio described above. It is therefore proposed here, for this type of fan, that the fan disc be constructed of titanium alloy, more specifically an alloy of type TA6V or TA17 (TA5CD4).

Furthermore, another further aspect of the present subject concerns, if the disc and blades are executed other than in a single piece, the shims which are ordinarily used at the bottom of the grooves in order to keep the blades upright against the ribs. These shims must in this case have the functions of limiting the displacement of the blade roots in the grooves during operation, of protecting the bottoms of the grooves and of cushioning the blades in case of their breakage or during ingestion of a large body by the turbomachine. In order to meet these constraints in the best possible manner, particularly within the new context described above, specifically within the context of reducing the radial dimension of the grooves mentioned in this patent application, the present patent application proposes a shim that has been rendered radially thinner versus the pre-existing solutions and having a radial thickness typically included between 1 and 3 mm, more particularly equal to 2 mm, its being specified that provision could be made for a shim of this kind even regardless of the constraints of intake diameter and hub ratio mentioned above and claimed. Each shim more specifically adopts the form of a two-sided plate, lying along the axis of the fan and capable of being placed against the bottom of one of the grooves. Preferentially, this shim is symmetrical in the three axial, radial and circumferential directions, which avoids any installation errors. Each side of the shim advantageously possesses lateral or circumferential edges, which are chamfered, wherein each chamfer forms an angle of 10°, plus or minus 2°, with one side. According to another particularity, the chamfers of each radially opposite side join at the lateral ends of the shim, forming the two lateral edges of the shim. The junction angles between the sides of the shim and the chamfers can be softened so as to exhibit a curvature radius of between 1.50 mm and 1.80 mm and more specifically of between 1.60 mm and 1.70 mm and preferentially equal to 1.65 mm. The junction angles between the chamfers forming the lateral edges of the shim can be softened so as to exhibit a curvature radius of between 0.45 mm and 0.75 mm and more specifically of between 0.52 mm and 0.68 mm and preferentially equal to 0.6 mm. According to one particular embodiment, each shim has a lateral dimension of between 17.0 mm and 18.2 mm and more specifically equal to 17.6 mm.

Figure 2:
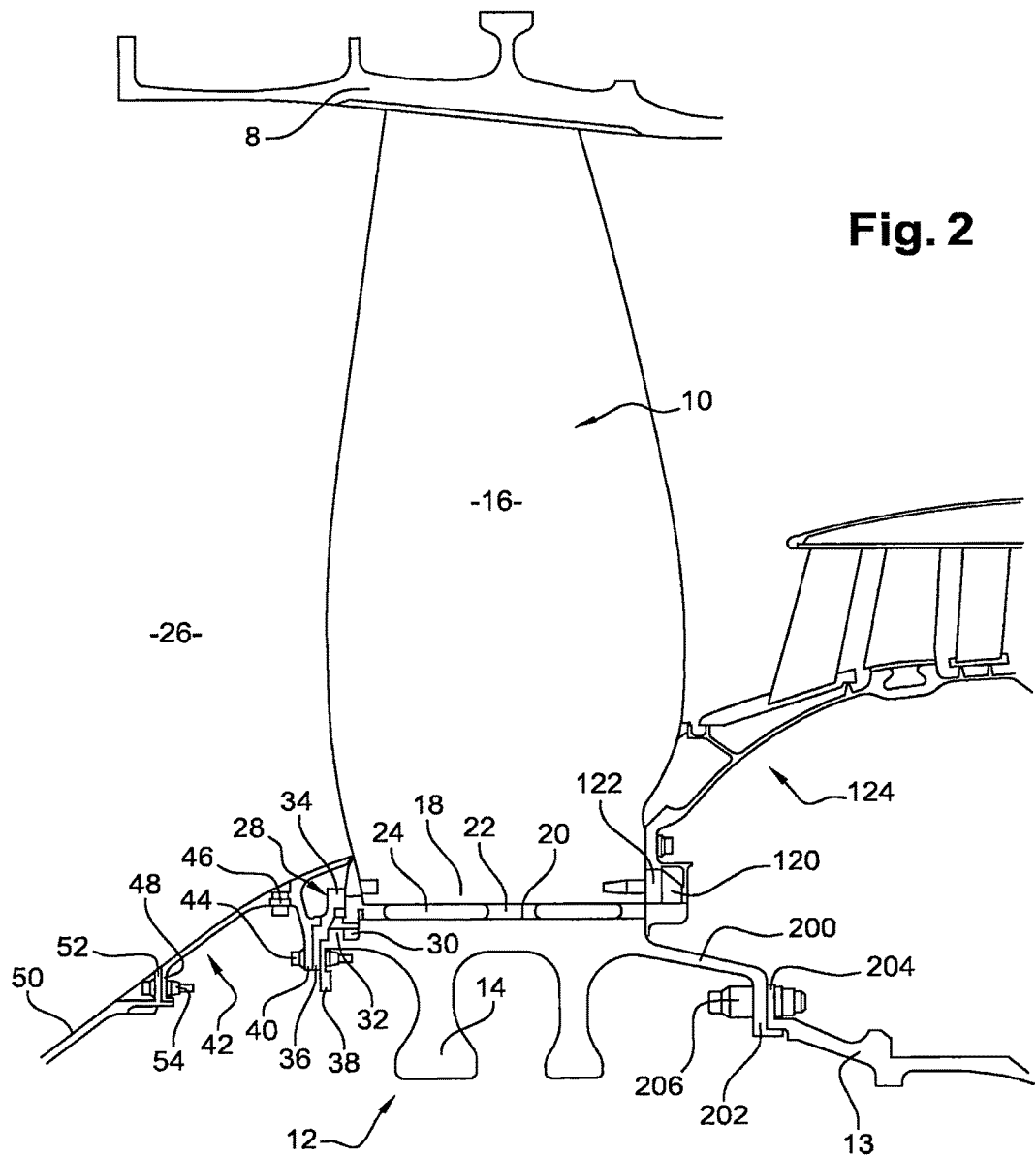
Figure 3:
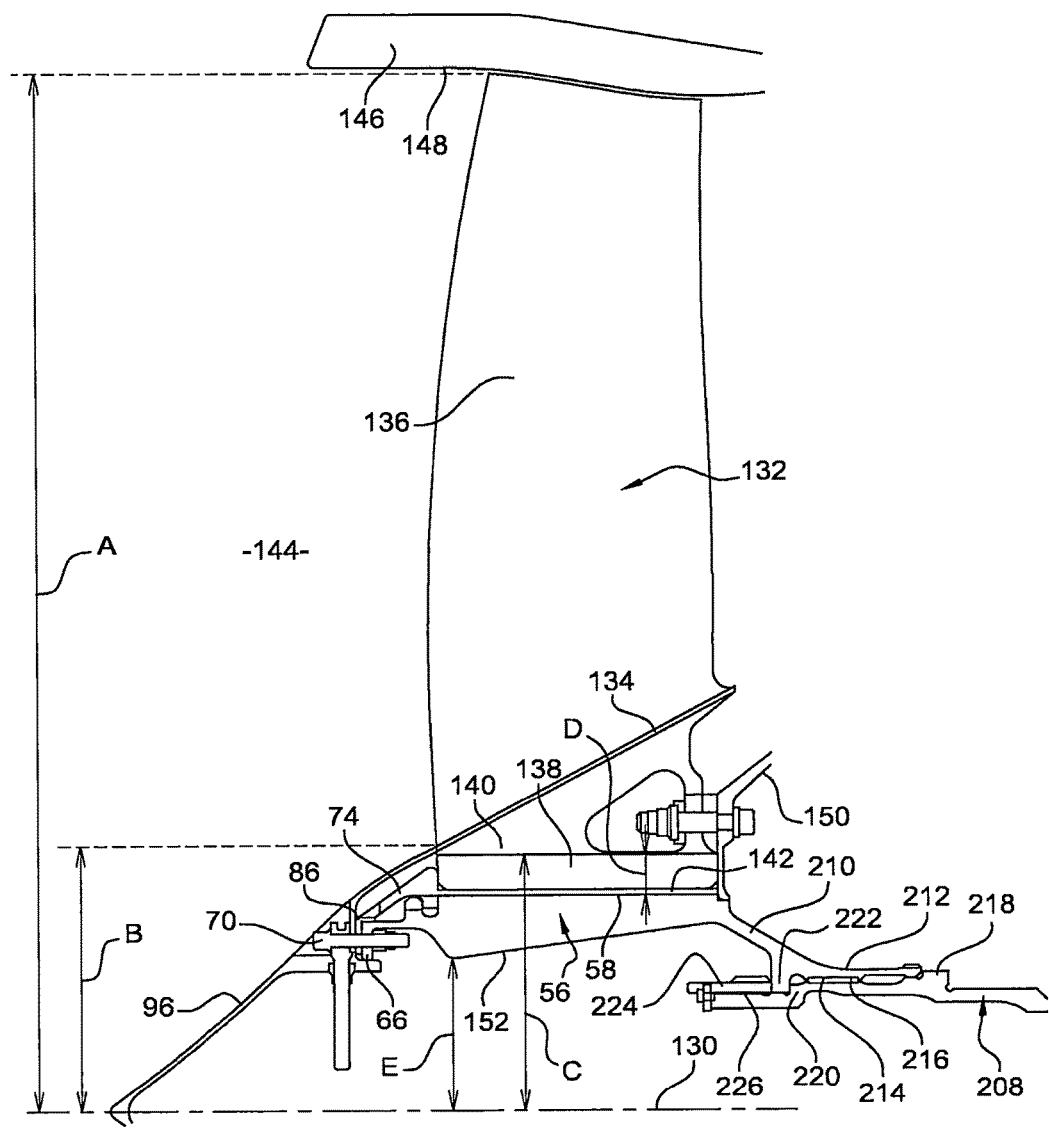
Figure 4:
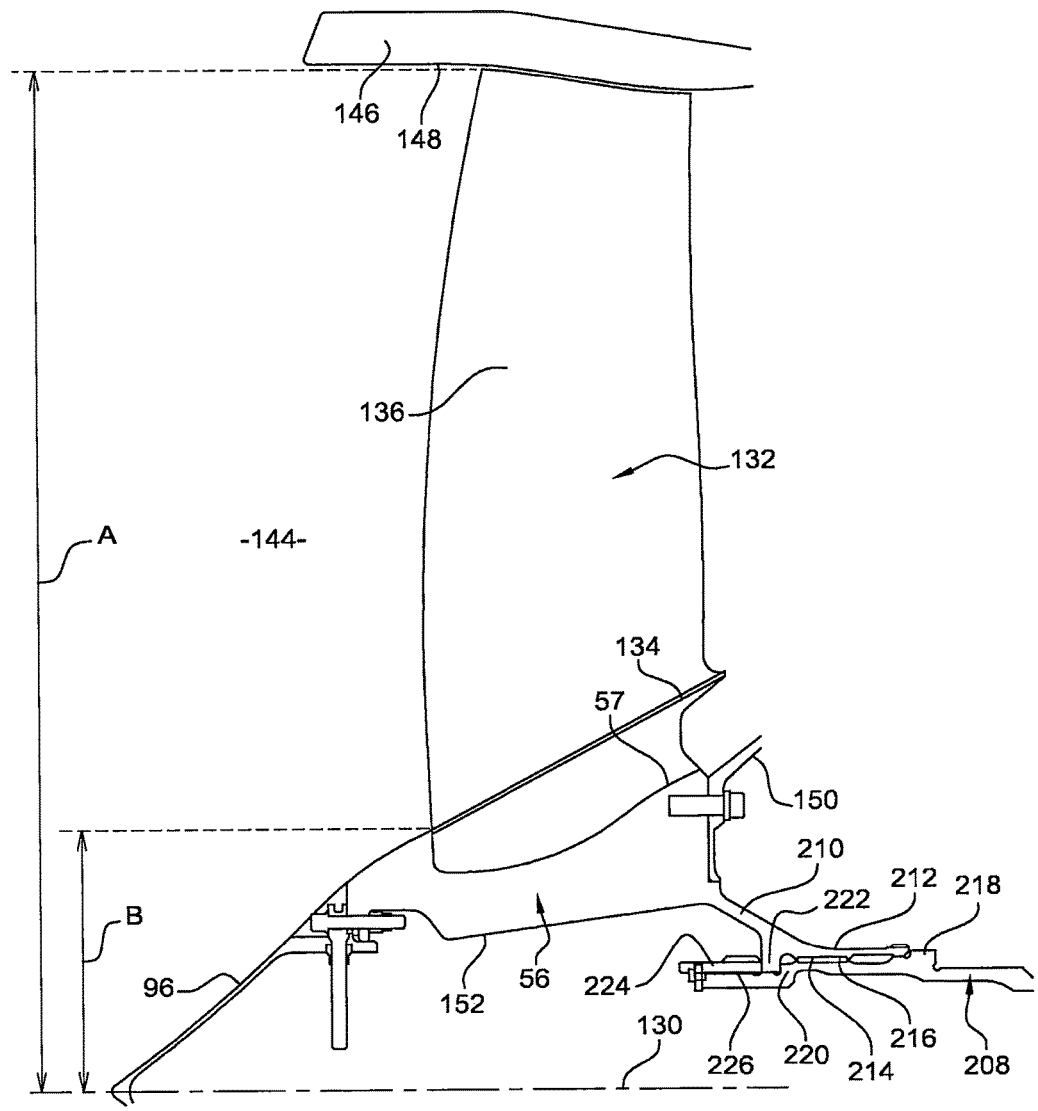
Figure 5:
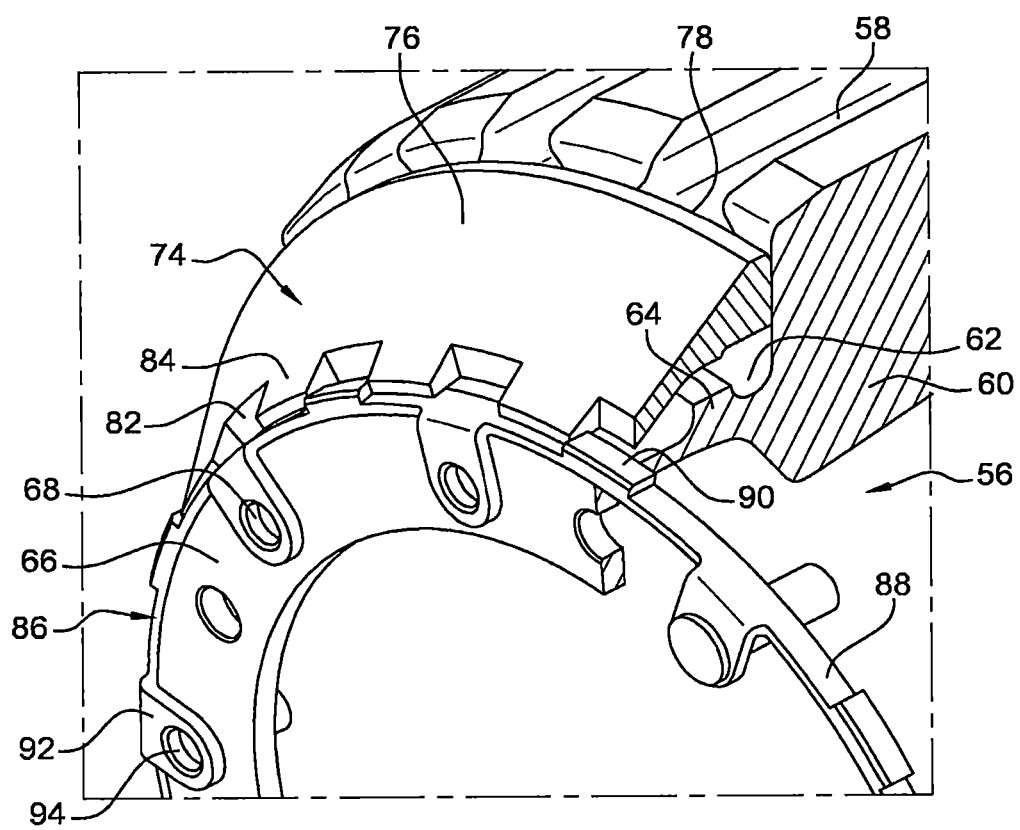
Figure 8:
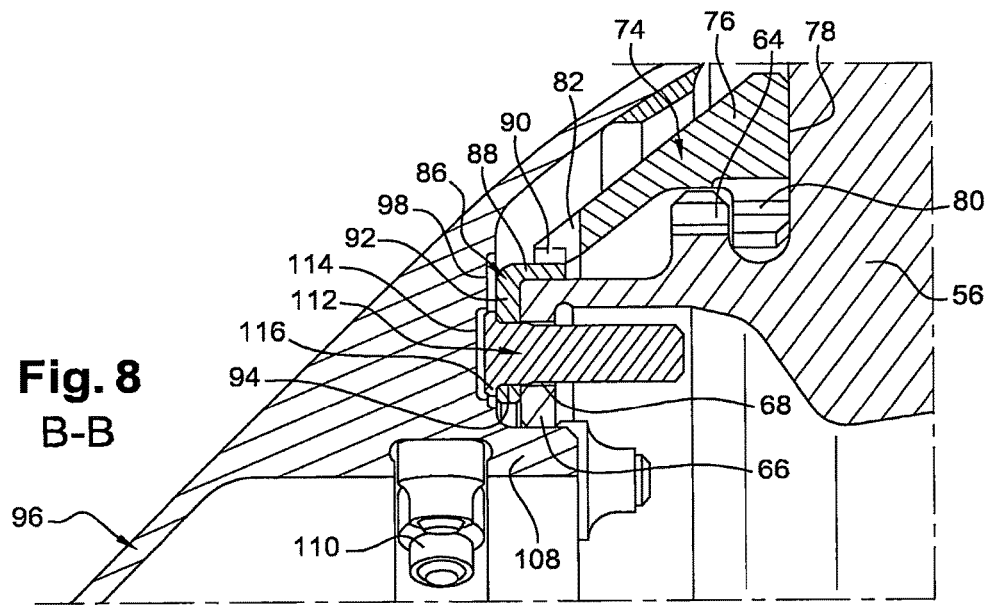
Figure 9:
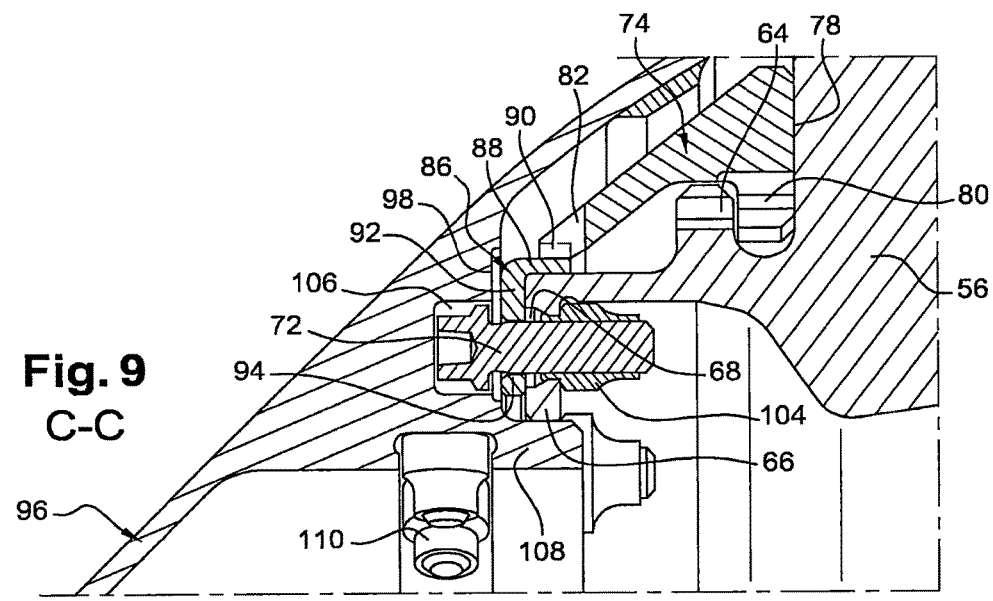
Figure 10:
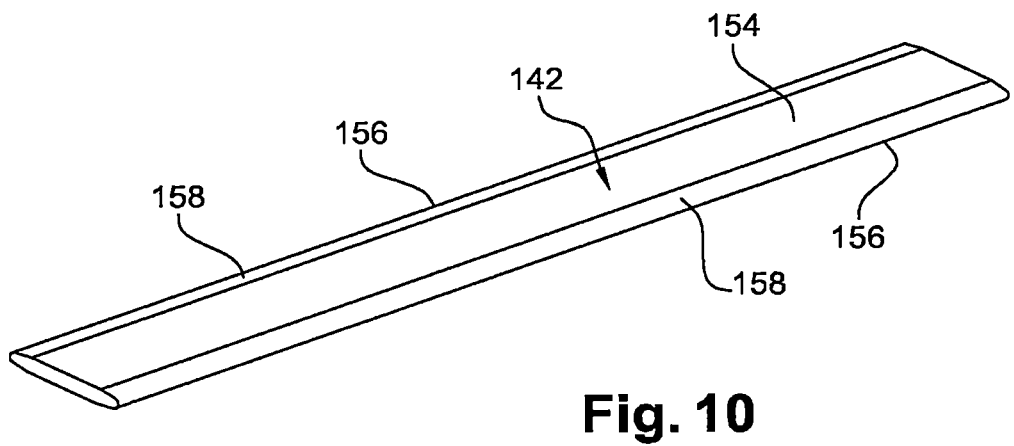
Figure 11:
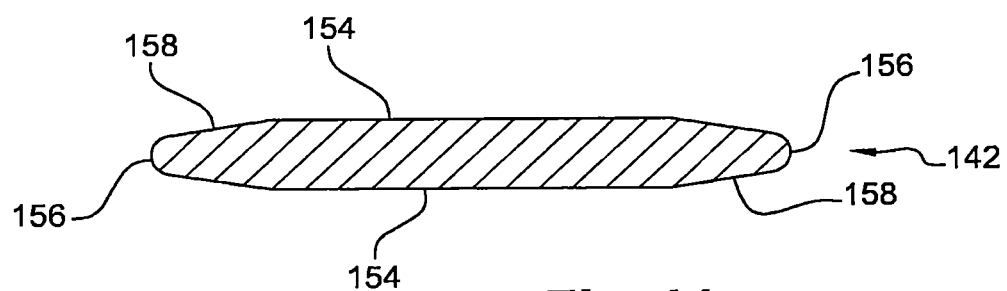

The various different aspects of the solutions presented here will be better understood and other details, characteristics and advantages thereof will become more clearly apparent in reading the following description, made by way of a non-restrictive example with reference to the appended drawings in which:

FIG. 1 is a perspective view, partially torn away, of a turbomachine according to the prior art, FIG. 2 is a partial, cross-sectional axial diagrammatic half-view of a turbomachine fan according to the prior art, FIG. 3 is a partial, cross-sectional axial diagrammatic half-view, true to scale, of a turbomachine fan according to the invention, in the case in which the blades are engaged in the grooves of the disc, FIG. 4 is a partial, cross-sectional axial diagrammatic half-view, true to scale, of a turbomachine fan according to the invention, in the case in which the blades are formed in one piece with the disc, FIG. 5 is a perspective view of an updated fan rotor with the cowling torn away, for the case in FIG. 3, FIG. 6 is a front view of the same assembly as that in FIG. 5, FIGS. 7, 8 and 9 are respective view of the cross-sections A-A, B-B and C-C in FIG. 6, FIG. 10 is a perspective view of a shim used in the fan according to the invention, for the case in FIG. 3, FIG. 11 is a cross-sectional view of the same shim. Reference will be made first of all to FIGS. 1 and 2, which therefore illustrate a turbomachine fan according to the technology prior to the present invention.

This fan comprises blades 10, carried by a disc 12, surrounded by an outer annular casing 8, between which (blades) inter-blade platforms (not illustrated) are interposed, wherein the disc 12 is fixed to the upstream end of a turbomachine shaft 13.

Each fan blade 10 comprises a vane 16 connected at its radially inner end to a root 18 which is engaged in a substantially axial groove 20 of a shape matching the disc 12, formed between two ribs 22 of the disc 12 and allowing radial retention of this blade 10 on the disc 12. A shim 24 is interposed between the root 18 of each blade 10 and the bottom of the corresponding groove 20 of the disc 12 in order to immobilise the blade 10 radially on the disc 12. "Leeks" 14 extending towards the inside of the fan are formed on the inside surface of the disc 12 in order to balance the disc 12.

The disc 12 comprises a truncated cone-shaped wall 200 closing in the downstream direction and extending from a portion of the disc 12 located radially between the grooves 20 and the "leeks" 14. The downstream end of the truncated cone-shaped wall 200 comprises a radial annular collar 202 featuring axial orifices interacting with axial orifices of a radial annular collar 204 formed upstream from the drive shaft 13, for passage of bolts 206.

The inter-blade platforms form a wall that internally delimits a stream 26 of the air flow entering the turbomachine and comprising means that interact with matching means provided on the disc 12, between the grooves 20, in order to fix the platforms on the disc.

The fan blades 10 are retained axially in the grooves 20 of the disc 12 via appropriate means mounted on the disc 12, upstream and downstream from the blades 10.

The retaining means located upstream comprise an annular flange 28 attached and fastened coaxially to the upstream end of the disc 12.

The flange 28 comprises an inner annular edge 30 which is scalloped or castellated and interacts with a castellated or scalloped outer annular edge 32 of the disc 12 in order to axially immobilise the flange 28 on the disc 12. This flange 28 is supported by an outer edge 34 on the shims 24 of the blade roots 18.

The flange 28 furthermore comprises an inner annular collar 36, which is interposed between a corresponding annular collar 38 of the disc 12 and an inner annular collar 40 of a shell 42 arranged upstream from the fan disc 12. The collars 36, 38, 40 comprise axial orifices (not visible) through which screws 44 or similar pass for clamping the collars to one another.

The shell 42 has a substantially truncated cone shape flaring out in the downstream direction, wherein the inter-blade platforms extend in the axial extension of this shell 42. This shell comprises radial drill holes 46 for installing balancing screws in addition to a collar 48 located at its upstream end. A conical cowling 50 is mounted on the upstream portion of the shell 42. More specifically, the downstream end of the cowling 50 comprises a collar 52, fixed to the upstream collar 48 of the shell 42 by means of screws 54.

Downstream from the blade 10, a hook 120 formed at the downstream end of the blade 10 allows axial retention and engages in a notch 122 formed at the upstream end of a compressor 124 prolonging the stream 26 downstream from the fan.

Such a structure has the disadvantages described above. In particular, it is not suitable for a fan of relatively small dimensions.

FIGS. 3 and 4 illustrate an embodiment of a fan according to the solution developed in this patent application and comprising, with regard to FIG. 3, a disc 56 bearing blades 132, the roots 138 of which are engaged in substantially axial grooves 58 of the outer circumference of the disc 56 and in case of FIG. 4, a disc 56 formed in one piece with the blades 132.

The disc 56 is arranged around the axis 130 of the turbomachine and is driven in rotation by a downstream drive shaft 208.

More specifically, the disc 56 is connected to a truncated cone-shaped wall 210 extending downstream from the disc 56 and closing. The downstream end of the truncated cone-shaped wall 210 is connected to a cylindrical wall 212, the inside surface of which comprises axial splines 214 arranged circumferentially side by side. These splines 214, directly connected to the disc 56, are engaged by positive interlocking with matching splines 216 arranged on the outer surface of the drive shaft 208.

The shaft 208 possesses, formed on its outer surface downstream from the splines 214, 216, a first annular shoulder 218 interacting by axial abutment against the downstream end of the cylindrical wall 212 connected to the disc 56 and bearing the splines 214. A second annular shoulder 220 formed upstream from the splines 214, 216 is in axial abutment against an annular edge 222 extending radially towards the inside from the truncated cone-shaped wall 210.

A nut 224 interacts with a thread 226 formed on the outer surface of the upstream end of the shaft 208 and rests axially in the downstream direction against the radial annular edge 222, so that the latter, in addition to the downstream end of the cylindrical wall 212, cannot become disengaged from their abutments against the shoulders 218, 220 of the shaft 208. In this manner, the disc 56 is axially, radially and circumferentially constrained in relation to the drive shaft 208.

This installation by splines between the disc 56 and the shaft 208 has the advantages of mechanical strength described above, particularly for small-sized fans.

In the specific case of FIG. 3, each fan blade 132 comprises a vane 136 connected at its radially inner end to a root 138 which is engaged in a substantially axial groove 58 of a shape matching the disc 56, formed between two ribs 140 of the disc 56 and allowing radial retention of this blade 132 on the disc 56.

The fan blades 132 are retained axially in the grooves 58 of the disc 56 via the means 74, 86, 70, 96 described below with reference to FIGS. 5 to 9 and arranged upstream from the blades 132.

A shim 142 is interposed between the root 138 of each blade 132 and the bottom of the corresponding groove 58 of the disc 56 in order to immobilise the blade 132 radially on the disc 56.

Inter-blade platforms 134 are interposed circumferentially between the blades 132. The inter-blade platforms 134 form a wall that internally delimits the stream 144 of the air flow entering the turbomachine and comprising means that interact with matching means provided on the disc 56, between the grooves 58, in order to fix the platforms on the disc.

The blades 132 are surrounded by an outer annular casing 146 delimiting the air intake of the turbomachine. The outer casing 146 comprises an inner annular wall 148 externally delimiting the stream 144 of the air flow entering the turbomachine and in relation to which the outer ends of the blades 132 rotate circumferentially.

The hub ratio of the fan illustrated corresponds to the ratio of the distance B between the axis 130 of the turbomachine and the inner limit of the stream 144 at the leading edge of the blade 132, divided by the distance A between the axis 130 of the turbomachine and the outer ends of the blades 132. The fan illustrated has been designed such as to obtain a hub ratio that may be between 0.25 and 0.27, whereas the distance A has a value of between 450 and 600 mm. This choice of hub ratio involves using a disc, the outer limit of which, at the tops of the ribs, is at a distance C from the axis 130 of between 115 mm and 145 mm.

Finally, the means 74, 86, 70, 96 of axial retention of the blades 132, which will be subsequently described, are sufficiently effective so that unlike the fan of the prior art illustrated in FIGS. 1 and 2, the fan according to the invention illustrated in FIGS. 3 is devoid of hooks for axial retention of the blades 132 arranged downstream from the blades 132. On the contrary, as can be seen, the low-pressure compressor 150 arranged downstream from the fan disc 56 abuts directly against the downstream ends of the blade roots 138 and the ribs 140 of the disc. Therefore, there is no longer any radial depth constraint of the ribs related to engagement of the downstream hooks.

Consequently, the grooves 58 are radially shallower, with a depth D of between 18 mm and 22 mm, than the grooves adapted for installation of a hook for axial retention of the blades. The shims 142 used to keep the blade roots 138 radially abutting against the ribs 140 are also radially thinner. The ribs 140, thereby less elongated, are in this case sufficiently compact in order to resist deformations and breakage. This increase in resistance of the ribs 140 allows construction of the disc from a titanium alloy that is relatively light in comparison to an inconel alloy for example.

Furthermore, considering the new weight distribution of the disc resulting from the change in height of the grooves, the inner wall of the disc 56 has been formed so as to have a balancing profile 152 of the disc 56 that is different in relation to that of the prior art having "leeks". This profile 152 of the wall is of truncated cone shape flaring out in the downstream direction and is formed by reaming. Proportionally to the disc, this balancing profile 152 extends less than the "leeks" towards the inside of the turbomachine, up to a minimum radius E included within the context of the invention between 60 mm and 70 mm, which represents the inner limit of the disc. Consequently, this balancing profile 152 is positioned radially on the outside of the nut 224 for clamping the disc 56 to the drive shaft 208. This profile 152 therefore allows passage of bulkier tools in the space for upstream axial access located around the axis 130 of the disc 56 and essential for installing the fan.

In the specific case of FIG. 4, the disc 56 is formed in one piece with the blades 132, wherein the blades extend from the outer surface 57 of the disc 56. Hence, there is no need to form means of axial securing of the blades. Specific mounting of the disc 56 on the drive shaft 208 using the nut 224 remains possible, as the balancing profile 152 can be formed in the same manner as in FIG. 3.

Reference will now be made to FIGS. 5 to 9, which illustrate more specifically the means of axial retention of the blades, in the case described with reference to FIG. 3. The disc comprises an annular rim 60 devoid of balancing "leeks" and prolonged upstream by an annular portion comprising an annular recess 62 delimited between an upstream face of the rim and a radial edge 64 extending towards the outside. The upstream end of the annular portion comprises a collar 66 extending radially towards the inside at a distance from the edge 64 and comprising, regularly distributed over its entire circumference, axial holes 68 through which screws 70, 72 pass. The edge 64 is scalloped or castellated and comprises solid sections alternating with hollow sections.

The fan rotor is equipped with means of axial retention of the blades on the disc in the upstream direction These means comprise a flange 74 installed in the annular recess 62 of the disc 56 and forming an axial abutment of the blade roots.

The flange 74 comprises a substantially truncated cone-shaped wall 76 flaring out in the downstream direction, the thickness of which increases in the downstream direction. The flange 74 is delimited at its downstream end by a radial face 78 abutting against the blades. The downstream end of the flange 74 comprises an inner annular edge 80 which is scalloped or castellated and comprises solid sections alternating with hollow sections and has shapes substantially matching those of the edge 64 of the disc 56 to allow installation and removal of the flange 74 in the annular recess 62 by axial translation, rotation of the flange 74 in relation to the disc 56 and axial securing of the flange 74 in the recess 62 of the disc by abutment of the solid sections of the edge 80 of the flange against the solid sections of the edge 64 of the disc.

The flange 74 finally comprises festoons 82 or hollow sections formed in alternation with solid sections 84 on its upstream edge.

The flange 74 is secured against rotation by means of a ring 86 comprising a cylindrical section 88 delimited by inner and outer cylindrical faces. The outer face comprises protrusions 90 extending radially outwards and circumferentially along said outer surface of the cylindrical section 88 and inserted in the festoons 82 of the upstream edge of the flange 74, providing an abutment against the solid sections 84 of the upstream edge of the flange 74 to ensure locking against rotation. The upstream edge of the ring is connected to ears 92 extending radially inwards, formed with holes 94 through which screws pass. These ears are in upstream axial contact against the collar 66 of the disc 56 such that the holes 94 of the ears 92 are aligned with the holes 68 of the collar 66 and the cylindrical section 88 of the ring is in axial abutment from the outside against the collar 66 of the disc. The ring 86 may be executed in high alloy steel, in order to withstand being torn out.

The flange 74 is thus secured against rotation by abutment of its solid sections 84 against the protrusions 90 of the ring.

A cowling 96, made for example of aluminium and conical in shape, is fixed to the disc 12. For this purpose, the cowling 96 comprises, in its median section, an internal annular edge 98 in which axial holes 100 (through holes) are formed (FIG. 7), located opposite a hole 94 on two of the rings 86 aligned with certain holes 68 in the collar 66 of the disc 56. These holes 100 have screws 70 passing through, interacting with nuts 102 mounted against the downstream section of the collar 66 of the disc 56 and allowing joining together of the cowling 96, the ring and the disc 56. The downstream section of the cowling 96 covers the ring 86 and the flange 74 such that the internal stream 26 defined by the inter-blade platforms extends in the axial prolongation of the downstream section of the cowling 96.

As can be seen in FIG. 9, all the other holes 94 of the ring apart from one, positioned opposite other holes 68 in the collar 66 of the disc 56 have screws 72 passing through, interacting with nuts 104 and serving solely to fix the ring 86 on the disc 56. The heads of these screws are housed in blind holes 106 formed in the inner edge 98 of the cowling 96.

The inner edge 98 of the cowling 96 also comprises a cylindrical neck collar 108 extending in the downstream direction, the end of which bears against the inner end of the collar 66 of the disc.

The cowling 96 furthermore comprises radial threads 110 used to install balancing screws, as is familiar from the prior art. In order to guarantee the correct position of these screws, the position of the cowling 96 needs to be indexed in relation to the fan rotor. For this purpose, as illustrated in FIG. 8, an indexing pin 112 is installed in the last hole 94 of the ring aligned with a hole 68 in the collar 66 of the disc 56. The pin 112 comprises a head 116 accommodated in a blind hole 114 of the inner edge 98 of the cowling 96, wherein the diameter of the head 116 of the pin 112 is determined such that it cannot be inserted in another blind hole 106, provided to accommodate the heads of the screws 72.

Reference will now be made to FIGS. 10 and 11, which represent the shims 142, wherein the latter have been adapted to the reduction in depth of the grooves 58. Each shim more specifically adopts the form of a two-sided plate 154, lying along the axis of the fan and placed against the bottom of one of the grooves 58. This shim is symmetrical in the three axial, radial and circumferential directions, which avoids any installation errors. Each side of the shim possesses its lateral edges 156, or circumferential edges, which are chamfered, wherein the chamfers 158 each form an angle of 10° with one side. The chamfers 158 of each radially opposite side 154 join at the lateral ends of the shim, forming the two lateral edges 156 of the shim. The junction angles between the sides 154 of the shim and the chamfers 158 are softened so as to exhibit a curvature radius of between 1.50 mm and 1.80 mm and more specifically of equal to 1.65 mm. The junction angles between the respective chamfers 158 forming the lateral edges 156 of the shim are softened so as to exhibit a curvature radius of between 0.45 mm and 0.75 mm and more specifically equal to 0.6 mm. Each shim 142 has a radial thickness of between 1 mm and 3 mm, more specifically equal to 2 mm and a lateral dimension of between 17.0 mm and 18.2 mm and more specifically equal to 17.6 mm.

The invention claimed is:

1. A fan for a jet engine, the fan comprising at an intake, fan blades, an annular casing, a hub adapted to rotate around an axis and bearing the fan blades, each fan blade having a leading edge, and the fan blades extending radially relative to said axis in an annular stream delimited internally by the hub and externally by the annular casing, wherein:
   said fan has an intake diameter, which corresponds to a diameter of a circle comprising radially outer ends of the fan blades, of a value of between 900 mm and 1200 mm and has a hub ratio, which corresponds to a ratio of a diameter of an inner limit of the annular stream at radially inner ends of leading edges of the fan blades, divided by the intake diameter, of a value of between 0.20 and 0.265;
   the hub comprises a fan disc having, at an outer circumference, ribs formed in alternation with grooves in which blade roots are engaged;
   a shim having a radial thickness of between 1 mm and 3 mm is interposed radially between one of said blade roots and one of said groove bottoms; and
   said fan disc has an outer limit, formed by outer ends of the ribs, a diameter of which is between 245 mm and 275 mm, and an inner limit, formed by an inner end of an inner wall of the fan disc, a diameter of which is between 120 mm and 140 mm.

2. The fan according to claim 1, wherein the fan disc has an outer limit, formed by outer ends of the ribs, a diameter of which is between 245 mm and 275 mm, and in that the grooves of the disc have a radial dimension between a bottom of the grooves and a top of the ribs, of a value between 18 mm and 22 mm.

3. The fan according to claim 1, wherein the internal wall of the fan disc is formed by an internal bore of a truncated cone shape, flaring out downstream, wherein an upstream end of the internal bore defines the inner limit of the fan disc, which inner limit defines a minimum radius of the fan disc.

4. The fan according to claim 1, wherein the fan disc bears between 17 and 21 fan blades.

5. The fan according to claim 4, wherein the disc bears between 18 and 20 fan blades.

6. The fan according to claim 1, wherein the disc is made of titanium alloy.

7. The fan according to claim 6, wherein the titanium alloy corresponds to one of TA6V, TU 7, and TA5CD4.

8. A jet engine comprising the fan according to claim 1.

9. A fan for a jet engine, comprising at an intake, fan blades, an annular casing, a hub rotating around an axis of the turbomachine and bearing the fan blades, which extend radially relative to said axis in an annular stream delimited internally by the hub and externally by the annular casing, wherein said fan has an intake diameter (A), which corresponds to the diameter of the circle comprising the radially outer ends of the fan Hades, of a value of between 900 mm and 1200 mm and has a hub ratio, which corresponds to a ratio of the diameter (B) of the inner limit of the stream at the radially inner ends of the leading edges of the fan blades, divided by the intake diameter, of a value of between 0.20 and 0.265, the hub comprising a fan disc having, at an outer circumference, ribs formed in alternation with grooves in which roots of the fan blades are engaged, the fan disc having an outer limit, farmed by outer ends of the ribs, a diameter of which is between 245 mm and 275 mm, and an inner limit, formed by an inner end of an internal wall of the disc, a diameter of which is between 120 mm and 140 mm.

10. A jet engine, comprising:
   a fan comprising at an intake, fan blades, an annular casing, a hub rotating around an axis of the turbomachine, said hub comprising a fan disc bearing the fan blades, which fan blades extend radially relative to said axis in an annular stream delimited internally by the hub and externally by the annular casing, wherein:
      said fan has an intake diameter (A), which corresponds to the diameter of the circle comprising the radially outer ends of the fan blades, of a value of between 900 mm and 1200 mm and has a hub ratio, which corresponds to a ratio of the diameter (B) of the inner limit of the stream at the radially inner ends of the leading edges of the fan blades, divided by the intake diameter, of a value of between 0.20 and 0.265, and
      the hub comprises a fan disc comprising at an outer circumference ribs formed in alternation with grooves in which blades roots of the fan blades are engaged, each groove having a groove bottom, and
   a shim having a radial thickness of between 1 mm and 3 mm is interposed radially between one of said blade roots and one of said groove bottoms, and
   a low-pressure compressor arranged downstream from the fan disc and which abuts directly against downstream ends of the blade roots and the ribs of the fan disc, wherein said fan disc has an outer limit, formed by outer ends of the ribs, a diameter of which is between 245 mm and 275 mm, and an inner limit formed by an inner end of an inner wall of the fan disc, a diameter of which is between 120 mm and 140 mm.

11. The jet engine of claim 10, which is devoid of hooks arranged downstream from the fan blades for axial retention of said fan blades, and the fan disc comprises:

an annular rim prolonged upstream by an annular portion comprising an annular recess of the fan disc delimited between an upstream face of the annular rim and a radial edge of the fan disc extending externally, and a flange disposed in the annular recess and forming there an axial abutment of the blade roots in the upstream direction.

12. The jet engine of claim 11, wherein the flange is delimited at a downstream end by a radial face abutting against the fan blades, said downstream end of the flange comprising an inner annular edge which is castellated and comprises solid sections alternating with hollow sections and has shapes substantially matching shapes of said radial edge of the fan disc, to allow an axial securing of the flange in the annular recess of the fan disc by abutment of solid sections of an edge of the flange against solid sections of the radial edge of the fan disc.

13. The jet engine of claim 10, wherein the grooves of the fan disc have a radial dimension between a bottom of the grooves and a top of the ribs, of a value between 18 mm and 22 mm.

* * * * *